3,370,973
ACTIVATION OF GLASS FOR ELECTROLESS METAL DEPOSITION OF UNIFORM THICK METAL FILMS

Lubomyr T. Romankiw, Lake Mohegan, N.Y., assignor to International Business Machines Corporation, New York, N.Y., a corporation of New York
No Drawing. Filed Dec. 28, 1964, Ser. No. 421,712
4 Claims. (Cl. 117—124)

This invention relates to the metallization of glass and similar vitrified ceramic surfaces so that one obtains an initial base for the subsequent electrodeposition or electroless deposition of other metals and/or alloys.

In most prior art depositions of metallic films by electroless means onto a glass substrate, the latter has been cleaned by conventional means before being sensitized by dipping into a stannous chloride solution. After the dipping, the glass is water rinsed and is subsequently activated with an aqueous solution of a catalyst metal, for example, palladium. During the activation, $Sn^{++}+Pd^{++}$ becomes $Sn^{++++}+Pd^0$. Accurate control of the variables in the sensitizing process is difficult, and failure to maintain proper control results in non-adherent or non-uniform metal films. Moreover, the family of iron films deposited on substrates activated as described above, even under optimum sensitizing and activating conditions, can be built up to only 1000 A.–4000 A. thickness before peeling, due to internal stresses in the films, commences.

It has been found that the thickness of the metallic film to be deposited onto glass as well as its adhesion to the glass depends largely on the adhesion of the catalytic metal to the glass substrate.

Thus, an object of this invention is to provide means for improving the deposition of metal onto insulated substrates.

Yet another object of this invention is to obtain a novel method for activating a glass base for subsequent metal deposition onto said base, whereby said activation takes place without the need to preclean or sensitize the glass surface and also provides a Pd-Ni base on which it is possible to subsequently deposit films as thick as 20,000 A.–30,000 A.

The foregoing and other objects, features and advantages of the invention will be apparent from the following more particular description of a preferred embodiment of the invention.

The present invention avoids the steps of sensitizing and precleaning by employing a novel dipping solution for the glass substrate. A suitable glass substrate to be plated is dipped into a solution of nickel-chloro-palladate dissolved in an equal volume ratio of alcohol and ether. The alcohol can be methyl or ethyl alcohol and the ether can be ethyl ether. In a minor variation of the organic solvent, a few drops of turpentine may be added to the solution. After the glass has been dipped into said solution of nickel-chloro-palladate, the wet substrate is fired in an open gas flame, in a high temperature oven, or by any other suitable means until the salt on the substrate is reduced to a metal. The preferred temperature of the heated substrate should be somewhere between 400° C.–500° C. The heated substrate is annealed by gradually bringing it to room temperature. The resulting end product is a very tenacious nickel-palladium layer adhering to the glass substrate. It should be noted that the temperature depends to some extent on the softening point of the glass or the vitrified substrate; with low melting point glass, a lower heating temperature can be used. When an open gas flame is used, it is sufficient to bring only the surface of the work to be treated to the desired high temperature.

After the substrate has been treated in the manner described above, the glass is now ready for a subsequent electroless deposition or electroplating of nickel. For electroless plating purposes, the nickel-chloro-palladate concentration can be small; thus a very thin layer of Ni-Pd alloy is deposited. The concentration of the nickel-chloro-palladate should be sufficient to result in a uniform film. In those instances where the filmed substrate is to be used for subsequent electroplating purposes, it is desired to have a larger nickel-chloro-palladate concentration in the organic solvent. The higher concentration leads to a thicker Ni-Pd film and a higher conductivity of the Ni-Pd layer.

The present invention is particularly useful in thin film technology where many electrical components and/or circuits must be deposited as very thin films onto an insulated substrate and such metallic films must remain adherent to their substrates during prolonged use of such metallic films in high-speed switching networks. The present procedure results in a layer of nickel-palladium that is so firmly imbedded in its glass substrate that subsequent deposits of metals can be as thick as 50,000 A. or more. Whereas most prior solutions leave a metallic residue that can support an electroless deposition of subsequent metals of only about 2000 A.–5000 A. before peeling from the insulated substrate, the present procedure not only allows for electroless deposition but also for the electrodeposition of subsequent metals. Since electrodepositions normally can be more accurately controlled than electroless depositions, the attainment of a very adherent nickel-palladium catalytic layer is highly desirable in the art of plating metals directly on to insulating substrates. Additionally, the alcohol ether solvent avoids the step of degreasing or precleaning the glass substrates because such solvent itself is a degreasing agent. Whereas prior art techniques required the degreased glass substrate to be sensitized with a stannous chloride solution before the catalyst metal layer is deposited, the present invention requires no sensitizing step.

Consequently, the use of nickel-chloro-palladate dissolved in alcohol and ether not only diminishes the number of steps required to electrolessly deposit a catalytic metal base on a vitrified material or an insulated substrate having high melting points, but also results in a more adherent catalytic layer capable of supporting thick layers of subsequent metal deposits, the latter being deposited either electrolessly or by electrodeposition. The process described above is not limited to a dipping process. The solution of nickel-chloro-palladate can be painted on, sprayed or be linked onto the substrate in various patterns by means of masks, or by any other suitable technique for applying the solution to the substrate.

Examples of nickel-chloro-palladate solutions used in practicing this invention are the following:

(1) 0.3 g. nickel-chloro-palladate dissolved in
    20 ml. of methyl alcohol-ethyl ether, 1:1 volume ratio.
(2) 0.3 g. nickel-chloro-palladate dissolved in
    20 ml. of methyl alcohol-ethyl ether, 1:1 volume ratio with
    10 drops of commercial type turpentine.
(3) 0.3 g. nickel-chloro-palladate dissolved in
    20 ml. of methyl alcohol-ethyl ether with 1:4 volume ratio or 4:1 volume ratio.

A representative solution to be employed when subsequent electrodeposition is desired is:

(4) 0.9 g. nickel-chloro-palladate dissolved in
    20 ml. of methyl alcohol-ethyl ether, 1:1 volume ratio.

As has been explained heretofore, ethyl alcohol can be used instead of methyl alcohol in the examples given

What is claimed is:

1. A method for activating glass, vitrified material, or high-melting insulating materials for the electroless metal deposition of uniform thick metal films characterized in that the glass does not have to be precleaned or pretreated comprising coating said glass with a solution of nickel-chloro-palladate in an organic solvent and reducing said nickel-chloro-palladate at a high temperature, whereby a nickel-palladium film is deposited on said glass.

2. The method of claim 1 wherein said organic solvent is an alcohol-ether mixture.

3. The method of claim 1 wherein said organic solvent is alcohol-ether and the ratio of the mixture of alcohol to ether is 1:1.

4. A method for coating a glass substrate comprising the steps of dipping said substrate into a solution of nickel-chloro-palladate dissolved in an organic solvent, reducing said nickel-chloro-palladate at a temperature of 350° C.–500° C. so as to obtain a nickel-palladium film as a deposit on said glass, and gradually bringing said glass to room temperature.

References Cited

UNITED STATES PATENTS

| | | | |
|---|---|---|---|
| 2,865,785 | 12/1958 | Coles | 117—54 X |
| 3,011,920 | 12/1961 | Shipley | 117—160 X |

ALFRED L. LEAVITT, *Primary Examiner.*

W. F. CYRON, *Assistant Examiner.*